Sept. 29, 1964　　　H. E. HALL, JR　　　3,151,242
RADIOACTIVITY WELL LOGGING

Filed June 15, 1959　　　　　　　　　　3 Sheets-Sheet 1

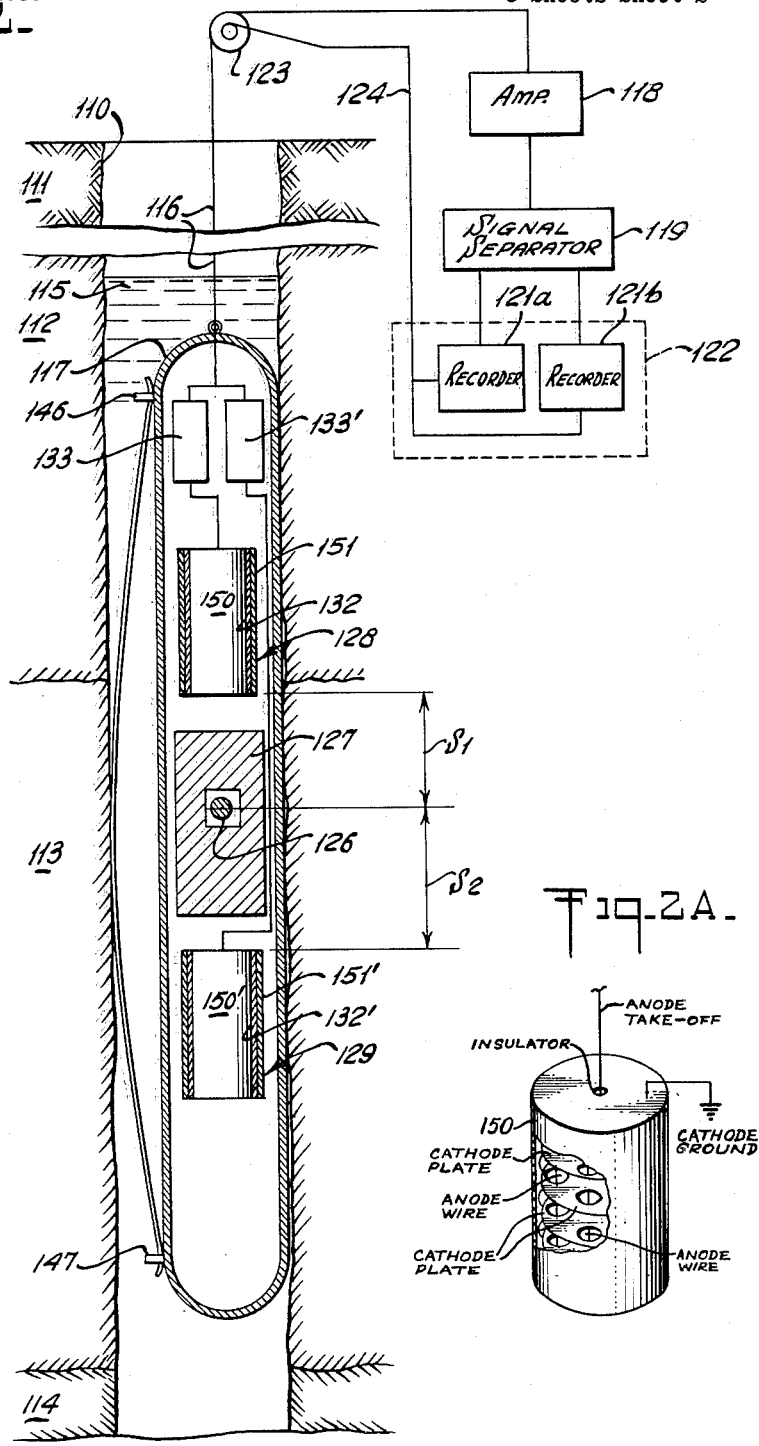

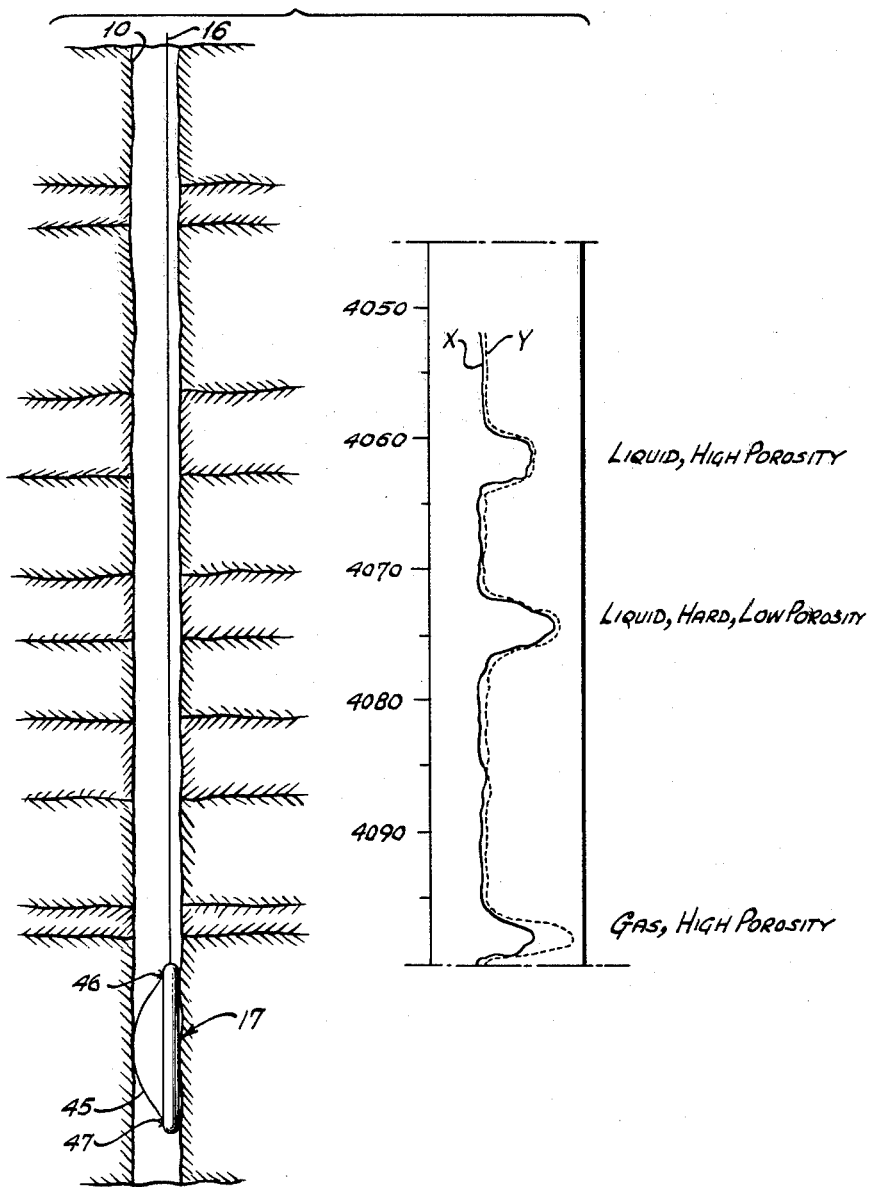

3,151,242
RADIOACTIVITY WELL LOGGING
Hugh E. Hall, Jr., Houston, Tex., assignor to Texaco Inc., New York, N.Y., a corporation of Delaware
Filed June 15, 1959, Ser. No. 820,237
4 Claims. (Cl. 250—83.3)

The present invention relates generally to the determination of the nature of earth formations; and, more particularly it is concerned with the analysis of earth formations along the traverse of a bore hole through irradiation of the formations with neutrons in order to produce certain observable effects that are detected as an indication of the nature of the formations. Accordingly, it is a general object of the present invention to provide improvements in radioactivity well logging wherein a source of neutrons is employed to cause observable effects indicative of the nature of the earth formations along the well bore.

The invention is especially directed toward improvements in neutron well logging for quantitatively determining in situ the presence of gas in earth formations traversed by a bore hole. Accordingly, it is a more particular object of the present invention to provide improvements in radioactivity well logging wherein a source of neutrons is employed to cause observable effects which are detected and measured as an indication of the presence of gas in the earth formations along the well bore.

It is well known to analyze earth formations in situ along the traverse of a bore hole through the use of various radioactivity analysis techniques. For example, it is possible to determine the presence of porous zones along the path of the bore hole through the use of techniques that may inidcate the presence or absence of hydrogen in the pores of the formation, which hydrogen may be present in hydrocarbon oil, water or gas. Such analysis may be carried on through the use of neutron-neutron or neutron-gamma logs in accordance with known techniques.

It is still another object of the present invention to provide improved methods and apparatus for quantitatively distinguishing between hydrocarbon oil or water and gas contained in the pores of an earth formation traversed by a bore hole and which is relatively insensitive to the adverse effect of certain other interfering substances which may also be present in the earth formations.

Briefly stated, the present invention is concerned with improvements in radioactivity well logging wherein a source of neutrons is passed through a bore hole to irradiate the formations traversed by the bore hole and wherein radiation is detected in a first zone spaced from the source to provide a first signal primarily indicative of hydrogen and radiation is also detected in a second zone spaced further from the source than said first zone to provide a second signal primarily indicative of the hydrogen content. The invention contemplates that the effect on both signals due to chlorine which may be present in the formation or bore hole is neutralized. The two signals are advantageously plotted in correlation with the position of the logging instrument in the bore hole in such manner that corresponding variations in the two signals provide a quantitative indication of the hydrogen content in the formation as a liquid and differences between the two signals provide a quantitative measure of the gas content of the formation.

A preferred aspect of the invention involves the use of improved apparatus for conducting such a method and which apparatus involves an elongated instrument housing suitable to be passed through a bore hole and containing a neutron source for irradiating the earth formations along the bore hole. Spaced a predetermined distance from the source along ___ ment, there is provided a ___ comprising a gamma radiation ___ volume substantially surrounded by ___ tron reactive material, such as cadmium ___ tection unit similar to the first detector un___ vided in the instrument and is spaced a prede___ distance from the source, which differs from the spa___ of the first detector from the source. Means are further provided for maintaining the position of the logging instrument in relatively fixed relation to the sides of the bore hole during the course of the logging run.

For additional objects and advantages and for a better understanding of the invention, attention is now directed to the following description and accompanying drawings. The features of the invention which are believed to be novel are particularly pointed out in the appended claims.

In the drawings:

FIGURE 2 is a schematic representation, similar to FIG. 1, showing another form of logging apparatus embodying principles of the invention;

FIG. 2A is a diagrammatic representation of a multiple plate cathode type counter if the type which may be employed as the detector 150 or 150' in the embodiment illustrated in FIG. 2; and, FIGURE 3 is a diagrammatic representation of a typical logging record which may be made in accordance with the teaching of the present invention.

Figure 1:
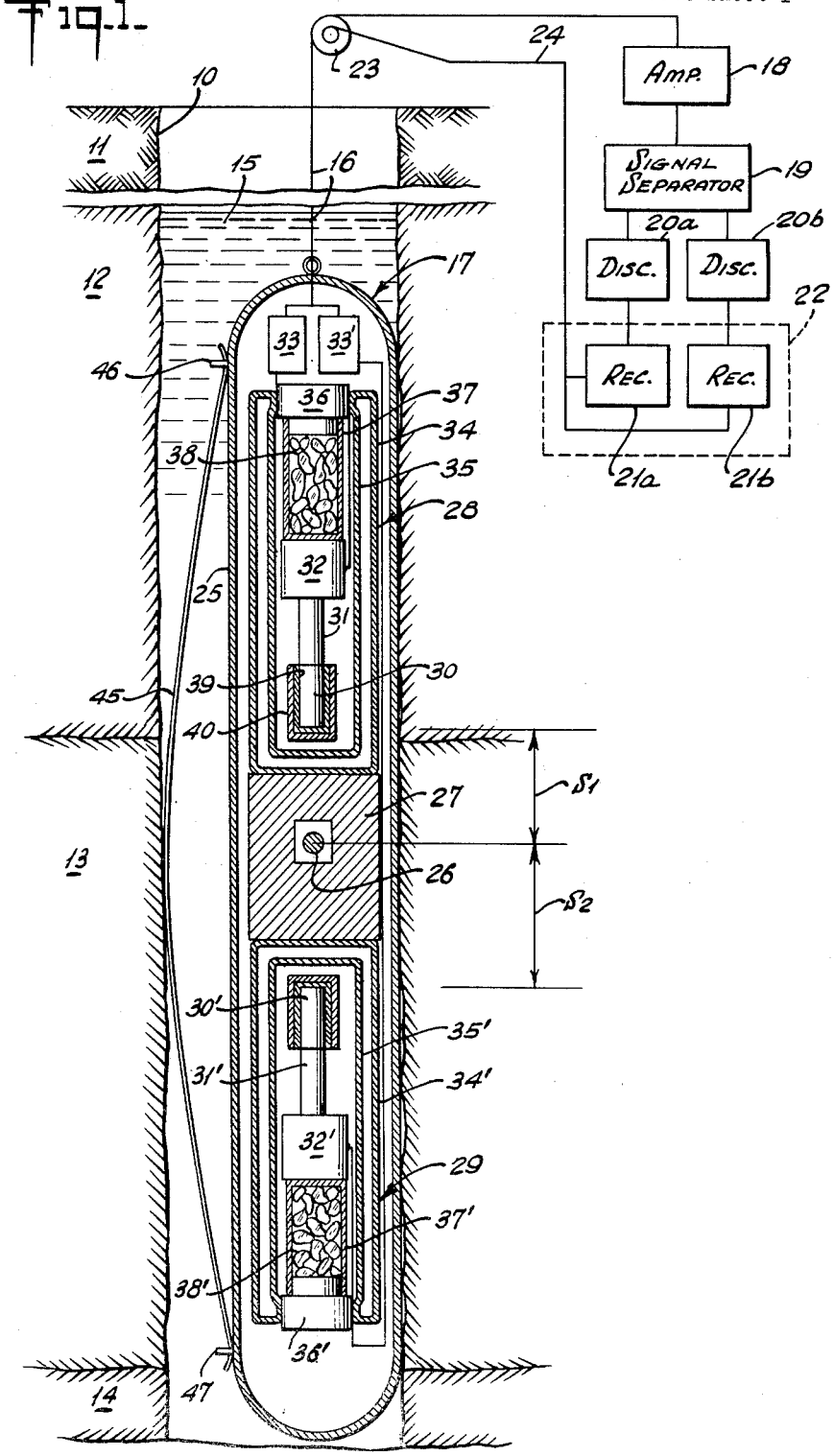
FIGURE 1 is a schematic representation showing a vertical elevation through a portion of a bore hole having a well logging instrument suspended therein and which is contructed in accordance with principles of the invention.

Referring now to FIG. 1 of the drawings, there is shown a bore hole 10 traversing a plurality of earth formations 11, 12, 13 and 14. The bore hole 10 is shown containing a fluid 15 such as water, or crude oil, for example. Suspended within the bore hole 10, as by means of a cable 16, there is shown a well logging instrument 17 constructed in accordance with the principles of the invention. The cable 16 may include an outer conductive sheath together with one or more insulated inner conductors (not individually shown) in order to afford means for transmitting electrical signals between the instrument 17 and electrical apparatus at the surface of the earth. The surface equipment provides means for receiving signals transmitted from the logging instrument 16 and amplifying and segregating the received signals as necessary for recording purposes. The surface apparatus includes an amplifier 18 having its output side connected to a signal separator 19 for separating different signals transmitted over the cables from the logging instrument, as discussed in greater detail below. The detailed operation of the separator 19 depends upon the method employed to send the separate signals from the logging instrument to the surface. Thus, the separator 19 may function to separate the signals according to ampltiude, frequency, polarity, pulse width, etc as the case may be. One output path from the separator 19 passes through a first pulse-height discriminator 20a to a first display device in the form of a recorder 21a and the other output path from the separator 19 passes through a second pulse-height discriminator 20b to a second display device in the form of a recorder 21b. It is to be understood that the two recording devices 21a, 21b may be separate recorders; however, they preferably comprise separate channels of a multi-channel recorder, as indicated by the dashed box 22 enclosing the two recording devices 21a, 21b. In any event, the signal display apparatus shown as the recorders 21a, 21b is understood to comprise ratemeter circuitry including such pulse-shaping networks as may be necessary or desirable p-
ter
s of
asur-
ing ... s type
suitab... instru-
ment 17 ... ously be
of the type ... tput signal
which may be t... e conductive
circuit 24 to the rec... rrelating the
recorded logging signal ... of the logging
instrument in the bore hole ... the well log.

The logging instrument 17 ... n elongated outer shell-like housing or casing 25 ... conventionally of steel in accordance with known techniques to withstand the pressures and temperatures commonly encountered in the well logging art. Advantageously, the housing should be of such character as to withstand the conditions that may be found in bore holes upwards of ten or twenty thousand feet in depth.

The casing 25 contains a neutron source 26 for bombarding the earth formations along the bore hole together with appropriate radiation detection equipment for detecting gamma rays induced in the formation as the result of irradiation by the source. Appropriate electrical circuitry is also enclosed within the casing for amplifying and otherwise handling the output signals from the radiation detection equipment for transmission over the cable 16 to the surface equipment. In particular, the neutron source 26 is shown positioned within the housing 25 and surrounded by a neutron-permeable shield 27 of lead or tungsten, for example, to prevent gamma radiation which may also be emitted thereby from passing either directly or indirectly to the detection equipment. In the upper end of the instrument 17, spaced a predetermined distance S–1 from the source 26, there is positioned a first radiation detection unit 28 which together with its associated circuitry is adapted and arranged to provide an output signal that is proportional to gamma radiation emitted from the adjacent earth formations and the material surrounding the detector in the tool, the intensity of which is a function of the interactions of neutrons from the source with hydrogen in the formation while substantially unaffected by the presence of chlorine in the formation, as discussed in detail below. The upper detection unit 28 is hereinafter referred to as the first detector or the shorter-spaced detector. Below the source 26, and spaced therefrom a predetermined distance S–2, there is provided a second detection unit 29 which is substantially identical with the first detector described above, except that it is spaced farther from the source than the first detector. The second detector may be referred to as the longer-spaced detector.

The upper or first detector 28 comprises a scintillation detector including a gamma ray sensitive luminophor 30, advantageously in the form of a sodium iodide crystal, together with a photomultiplier tube 31 shown mounted adjacent the luminophor 30 for detecting the photon output pulses from the luminophor and providing an electrical signal proportional thereto. The photomultiplier tube is shown adjacent a preamplifier 32 which, in turn, is shown electrically connected to additional electrical equipment identified as an amplifier 33 for transmission ut signal derived from the photomultiplier tube
... surface equipment by means of the cable 16.
be understood that the photomultiplier tube 31 is
... ed by means of a high voltage source (not shown)
... may comprise batteries positioned in the logging
... ument or, more conventionally, may involve the use
... ower supply equipment including a transformer and
... ifier in the logging instrument for deriving appropriate
... gh direct-current operating potential from electric power
transmitted as alternating current from the surface to the
logging instrument in the bore hole. It is to be further
understood that the amplifier 33 may actually include any
additional circuitry required for handling the transmission
of the signal information to the surface in accordance with
principles well known in the art. For example, the radiation detector signals may be transmitted to the surface as
amplitude modulated signals, or may be transmitted in the
form of frequency modulated signals, in accordance with
well-known techniques. If a so-called single conductor
cable is employed, the respective signal from the separate
detector may be transmitted simultaneously as pulses of
different polarity or as signal information on carriers of
different frequency, for example. The luminophor 30 is
shown mounted within a conventional aluminum container 39 which serves to protect it from moisture and physical damage. The upper end of the container 39 facing the photomultiplier 31 is also shown as open, with the luminophor 30 in direct contact with the photomultiplier 31. However, it is to be understood that the container 39 may be sealed with a transparent cover of glass or plastic in a manner known in the art. Surrounding the container 39 there is provided a thin layer 40 of a neutron absorbing material, such as cadmium, which emits a plurality of gamma radiations upon capturing a neutron and which, as hereinafter discussed, functions in combination with other elements of the invention to render the neutron-gamma ray signal derived by the hydrogen detector primarily sensitive to hydrogen and relatively insensitive to the effect of chlorine.

In order to insure that the hydrogen detector is responsive to the hydrogen only and not the natural gamma radiation or scattered gamma radiation from the neutron source, the discriminator associated therewith should advantageously be biased to exclude these undesirable lower energy gamma rays. Preferably, the discriminator should be biased so that the measured radiation signal is indicative of gamma rays having an electron energy of about 1.8 million electron volts and above as will be discussed later. This particular bias level, in combination with the 2″ x 4″ sodium iodide crystal and a cadmium layer for the neutron absorbing material 40 which surrounds the luminophor 30 at a source-to-detector spacing of 16 inches operates to provide a very satisfactory logging signal which is primarily responsive to the hydrogen content of the formations, due to radiation resulting from irradiation of the formation by neutrons from the source 26. By thus biasing the detector to exclude lower energy gamma rays, most of the natural gamma radiation present in the formation and any gamma radiation scattered from the source is likely to be eliminated from the detected signal, since the natural and scattered gamma radiations are both of relatively low energy level.

In accordance with the so-called neutron-gamma ray logs, a source of neutrons is passed through the bore hole in order to irradiate the earth formations along the traverse of the bore hole. The neutrons from the source are slowed down in the formation and bore hole fluid, primarily due to the effect of hydrogen, and after being slowed to the thermal range the neutrons are captured by material of the formation and of the logging tool with the resultant emission of gamma rays. These neutron-gamma rays are detected and their intensity, i.e. rate-of-occurrence, is used as a measure of the hydrogen content of the formations.

When the thermalized neutrons are captured by hydrogen, gamma rays having a characteristic energy of 2.2 million electron volts are emitted by the hydrogen responsible for the capture. When only hydrogen is present in the pores of the region under investigation, the intensity, i.e. rate-of-occurrence of the detected gamma radiation provides a good quantitative indication of the hydrogen content of the formation. However, it has been determined that other materials which may also be present in the formation can have an adverse effect on the neutron-gamma ray well log and which may render the log unreliable as a hydrogen measurement. Of particular significance is the presence of chlorine which has a relatively high capture cross-section for thermal neutrons, as compared with that of hydrogen. In particular, chlorine has a neutron capture cross-section of about 32 barns, whereas hydrogen has a neutron capture cross-section of about .33 barn. Thus, chlorine is approximately 100 times more effective in capturing thermal neutrons than hydrogen. When a thermal neutron is captured by chlorine, rather than hydrogen, about 3.1 gamma rays (on the average) are emitted per capture as compared with one gamma ray per capture by a hydrogen atom. In addition to the foregoing, many of the gamma rays emitted by chlorine are of higher energy range, from about 4–8 mev., than the characteristic 2.2 mev. gamma rays of capture emited by hydrogen. In view of the foregoing the presence of even a small amount of chlorine will ordinarily increase the intensity of the gamma radiation detected by the neutron-gamma ray instrument, thus giving a false indication of hydrogen content in the resultant log.

The neutralization of the adverse effect of chlorine upon the neutron gamma ray well log described above is accomplished by subjecting the gamma ray detector to radiation which varies inversely with the effect upon the detector due to the presence of chlorine. Chlorine has a relatively high capture cross-section and emits a plurality of gamma rays in response to the capture of each neutron. Thus, the counting rate of the gamma ray detector is increased due to the presence of chlorine. In order to neutralize the effect of chlorine a gamma ray signal is developed whose intensity decreases correspondingly due to the presence of chlorine. This may be accomplished by developing a gamma ray signal whose intensity is proportional to the thermal neutron flux in the vicinity of the detector. This is due to the fact that chlorine absorbs or removes thermal neutrons from the environment of the detector due to its relatively high capture cross-section. Thus, the thermal neutron flux in the vicinity of the detector is reduced due to the presence of chlorine. By introducing a neutron-absorbing material which emits a plurality of neutron capture gamma radiations in the vicinity of the detector, thermal neutrons are absorbed in said material which result in the emission of gamma radiation which is detected by the gamma ray detector. Using a sodium iodide detector, the thickness of cadmium needs to be at least enough to absorb most of the thermal neutrons and the balance is achieved by adjusting the discriminator bias. When the logging instrument passes into a region containing chlorine from an identical region with the excepton that no chlorine is present, the counting rate of the gamma ray detector tends to increase due to the increase of the number of capture gamma rays directly attributable to the chlorine. However, when this occurs, the number of thermal neutrons available for capture by the neutron absorbing material around the detector is reduced thus tending to decrease the counting rate in the gamma ray detector. By suitable means, these two effects may be made to cancel one another, so that when a logging tool using this system is passed from a formation containing chlorine to one not containing chlorine but having the same porosity, formation matrix, and hydrogen content, the response remains constant.

In the apparatus shown in FIG. 1, the abovementioned two effects may be made equal and opposite either by adjusting the bias of the discriminator, by adjustment of the amount of the neutron absorbing material 40, or by a combination of the first two techniques. For example, the neutron absorbing material 40 may be a sheet of cadmium surrounding the crystal at such a thickness, i.e. .025", that it essentially captures all of the thermal neutrons which diffuse to the layer of cadmium. The rise in the capture gamma component may be balanced against the thermal neutron component by a discriminator setting of approximately 1.8 mev. for a source-to-detector spacing of 16". The discriminator bias will be in the range from 1 to 2.5 mev. depending upon the detector-to-source spacing, the dimension of the crystal, the case thickness, the case material, the diameter of the bore hole and the salinity of the fluid.

At lower bias settings, there is more thermal neutron component than is necessary, and at higher bias settings there is less than is needed. Thus, in accordance with one aspect of the invention the bias may be set, for example, at 1.0 mev. and the thickness of cadmium adjusted so that the two effects cancel. If this were done, one would wish to place an additional neutron absorbing material between the crystal and the cadmium, such as boron or lithium, sufficiently thick to absorb the thermal neutrons transmitted through the cadmium. This would be desirable since neither boron nor lithium emit neutron capture gamma rays above 1.0 mev. and the crystal would not become activated. This aspect may be carried out with the hydrogen detector of FIG. 1 by the addition of a layer of neutron capturing material, such as boron, between the neutron interaction material 40 and the luminophor 30.

While cadmium is preferred as the material for capturing the thermal neutrons in the vicinity of the detector in order to neutralize the effect of chlorine upon the neutron gamma ray log, it is to be understood that other materials may be employed rather than cadmium and that other materials may be employed together with cadmium. In the present case, where the cadmium is employed in a logging instrument having a steel instrument casing or housing, the iron of the logging instrument actually cooperates with the cadmium. Iron has a much lower capture cross-section for neutrons than cadmium, however, there is a relatively large quantity of iron present in the vicinity of the detector, hence, its effect is similar to that of the cadmium. Iron has a thermal neutron capture cross-section of 2.43 barns compared with a capture cross-section of about 3500 barns for cadmium. Iron emits neutron capture gamma rays ranging up to 9.3 mev., whereas cadmium emits gammas up to 9.05 mev. upon capture of thermal neutrons. Gadolinium may also be employed in carrying out the invention. Gadolinium has a capture cross-section of 36,300 barns and emits neutron capture gammas up to 7.78 mev. As mentioned above, chlorine, the effect of which is to be balanced out of the resultant detected gamma ray signal, has a capture cross-section of about 32 barns and produces neutron capture gamma rays up to about 8.56 mev.

Whether cadmium or other material having similar characteristics or a combination of such materials is employed, such as the combination of cadmium with the steel logging casing, it is important that the sum total of such material used having a predetermined net effect which results in the development of a gamma ray signal in response to the thermal neutron population in the immediate vicinity of the detector which just cancels out the capture gamma effect due to the presence of chlorine in the bore hole and formation in the vicinity of the detector.

In a preferred embodiment employing a neutron source comprising 200 mg. of Ra:Be, a sodium iodide crystal radiation detector of 4" length and 2" diameter biased at 1.8 mev., and having its near side spaced from the neutron source a distance of 16", it has been found that with a steel logging casing having a thickness of $5/16$", a cadmium sleeve greater than 10 mils in thickness provides very satisfactory cancellation of the adverse effects of chlorine on the neutron-gamma ray log in formations having average ranges of porosity and salinity which are 10–30% porosity and salinities from zero to saturation.

In order to stabilize and protect the scintillation logging equipment against the effect of high bore hole temperatures and variations thereof, the luminophor 30 and photomultiplier tube 31, as well as the preamplifier 32, are all shown mounted within an insulated chamber preferably in the form of a Dewar flask comprising an outer wall 34 separated from an inner wall 35 by an evacuated space. The insulating chamber is provided with an appropriate removable insulating cover plug 36. Within the Dewar flask, advantageously affixed to the inside of the insulated cover plug 36, there is provided a coolant chamber 37 having thermally conductive walls as of thin aluminum and containing a quantity of ice 38. The coolant chamber including the ice 38 affords means for maintaining the scintillation detection equipment in a stable, low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Leters Patent No. 2,824,233, granted February 18, 1958, to Gerhard Herzog.

The lower or second detector 29 is substantially like the upper or first detector 28 and similar elements bear corresponding reference numerals having a primed designation.

In order to stabilize the position of the logging instrument throughout the logging run, there is provided a decentralizing bow spring 45 having its upper and lower ends 46 and 47 mounted to the logging instrument 17 in such manner that the spring is free to flex as the instrument is moved past irregularities in the side of the bore hole. Conventionally this may be achieved by mounting the upper and lower ends of the bow spring 45 in slidably engageable relationship to the instrument 17, as by means of elongated slots (not shown) in the bow spring 45.

Both of the neutron-gamma logs of the invention are long-spaced logs, i.e., both the first and second detectors are spaced from the source beyond the critical distance where changes in porosity do not affect the neutron gamma ray signal intensity. The spacing between the neutron source 26 and the shorter-spaced and longer-spaced detectors, respectively, should differ by 2 to 10 inches, but should preferably not exceed six (6) inches due to the fact that changes in bore hole diameter have a greater effect on the shorter-spaced log than on the longer-spaced log. While the specific spacing may vary somewhat, advantageously it has been determined that with a 200 mg. radium-beryllium source or equivalent and luminophors of 4" in length and 2" in diameter, the shorter spacing S–1 between the source 26 and the near end of the first luminophor 30 should be between 6 and 14 inches, with 10 inches being preferred, while the longer spacing S–2 between the source 26 and the near end of the second luminophor 30' should be between 14 and 20 inches, with 15 inches being found quite satisfactory. It is to be understood that with increased source strength the maximum source-to-detector spacings may be increased somewhat; however, it is to be understood that, advantageously the spacing S–2 of the second or longer spaced luminophor 30' from the source 26 should exceed the spacing S–1 of the first or shorter-spaced luminophor 30 from the source 26 by a distance of from 2 to 10 inches.

The logging instrument may be calibrated by positioning the logging instrument opposite a zone in the formation known to be 100% saturated with liquid, and noting the measured radiation response. Advantageously, the response then may be adjusted to some desired position on the chart. Similarly, the instrument should be positioned opposite a zone in the formation having 100% gas saturation, and the instrument should then be adjusted so that the logging chart indicates a desired value. Advantageously, to facilitate interpretation, the sensitivities of the logging equipment should be adjusted so that both signals track in liquid filled formations of varying porosities. Then, with the instrument positioned opposite a zone containing gas, any large differences between signals indicated by the first detector and the second detector will be due to the presence of gas. With the appartus thus calibrated, any separation or deviation between the two signals indicates that the signal is due to gas to an extent proportional to the deviation between the two signals. When the shorter-spaced signal indicates a high concentration of hydrogen while the longer-spaced signal is substantially coincident therewith, there is a good indication that liquid is present in the formation as oil or water and the exact quantity thereof is also shown. When the shorter-spaced signal indicates a high porosity or hydrogen value, but with the longer-spaced signal being widely separated therefrom, there is provided an indication that the formation is largely filled with dry gas, with the degree of separation between the two signals indicating the quantity of gas, or the wetness of the gas.

Referring now to FIG. 3, there is shown a cross-section of a bore hole traversing a plurality of earth formations and having suspended therein a logging instrument 17 in accordance with the invention, such as that shown in FIG. 1. Plotted alongside the diagram of the bore hole and earth formations there is shown a typical logging record of the adjacent earth formations made by the instrument 17. This record shows a first trace X showing radiation intensity signal of the first or shorter-spaced detector (increasing to the right as seen in the record) and primarily representative of the hydrogen content of the formation and a second trace Y showing radiation intensity of the longer-spaced detector (also increasing to the right as seen in the record) which is also sensitive to the hydrogen content of the earth formations, but which increases more in gas zones than does the shorter-spaced log. Regions of corersponding deviations, i.e. where the two logs track, of the two traces indicate the presence of a liquid, i.e. oil or water, and regions where the Y signal exceeds the X signal indicates the presence of gas. Thus, in the region just below 4095 feet there is an indication of gas. In the region just below 4070 feet there is an indication of low porosity with both X and Y being relatively high in value. In the region just below 4060 feet there is an indication which may be interpreted as a high porosity formation containing oil or water.

Although the two logging signals X and Y indicating the hydrogen content are shown recorded on the same chart, it is to be understood that they may be recorded as individual traces on separate logging charts, with the two records being interpreted by overlaying one with respect to the other in order that corresponding variations and differences between the respective logs may be interpreted. In such case it is to be understood that the logging system should be adjusted so that the two logging signals show deviations on the same scale of values.

It is also contemplated that, instead of recording both signals individually, only one of the two signals, preferably the longer-spaced log, may be recorded together with a second correlated signal showing the ratio or difference between the two logs.

It is also noted that the one log may be plotted versus the other in which case a straight line indication will be given for oil or water, with deviations therefrom indicating the gas content.

In order to conduct a logging run with the herein disclosed apparatus the instrument 17 is preferably lowered below the region of the well to be logged and drawn upwardly through the well at a predetermined constant rate.

while the outputs of the two detector units 28 and 29 are transmitted over the cable 16 to the surface equipment where they are channeled according to amplitude to the appropriate recording device. The intensity, i.e. rate-of-occurrence, of the detected radiation in each of the two channels is recorded in correlation with the location of the logging instrument in the bore hole.

Referring now to FIG. 2, there is shown another embodiment of the invention wherein elements corresponding to those of the apparatus shown in FIG. 1 are identified with reference numerals having a value of 100 plus the value of the numeral applied to the corresponding element of FIG. 1. Thus, for example, the bore hole 10 and formation 11–14 of FIG. 1 correspond to the bore hole 110 and the formations 111–114 of FIG. 2.

Whereas the apparatus of FIG. 1 discloses gamma ray detection apparatus of the scintillation type, the detection apparatus of FIG. 2 involves the use of high efficiency electrical pulse producing type detectors of the type disclosed in U.S. Patent 2,397,071 in the name of D. G. C. Hare. These detectors, which may for convenience be referred to as high efficiency multiple plate cathode type geiger counters, enable the construction of a very reliable neutron-gamma ray well logging instrument embodying principles of the invention and which affords certain advantages as compared with apparatus involving scintillation type detectors.

In particular, the upper detector unit 128 of the logging instrument shown in FIG. 2 is in the form of a high efficiency multiple plate pulse counter 150 having a thin layer or sleeve of material 132 such as cadmium surrounding its active volume in order to render the signal of the hydrogen detector insensitive to chlorine, as discussed above with respect to the apparatus of FIG. 1. The neutron interaction layer 132 is, in turn, surrounded by a shield 151 of lead or the like for excluding low energy scattered gamma radiation which may be emitted by the source along with the neutrons. It has been found that this shield 151 should have a gamma ray stopping power of ¼" thick lead or equivalent for a radium beryllium neutron source. The radiation detection equipment shown in FIG. 2 does not include a pulse-height discriminator such as that shown in FIGURE 1. By using the high efficiency pulse type detector, together with the disclosed lead shielding, the scattered gamma radiation from the Ra:Be neutron source are eliminated satisfactorily.

In the apparatus shown in FIG. 2, the detector is sensitive to gamma radiation having energies above a few kev. Therefore, in order to make this log insensitive to the chlorine content in the volume surrounding the detector, the capture gamma component of the response may be balanced against the thermal neutron component only by varying the amount of neutron absorbing material 132 in the vicinity of the detector. Various neutron absorbing materials 132 may be used as previously discussed. For example, a sheet of cadmium sufficiently thick to capture all of the thermal neutrons which get to the cadmium, placed around a 2" x 4" gamma radiation detector as previously described, over compensates or, in other words, introduces a thermal neutron component in the response which is too large. The amount of cadmium may be reduced slightly, i.e. by cutting holes in it, to afford the correct degree of compensation. To afford the correct degree of compensation, approximately 25% of the thick cadmium sheet should be removed by cutting small holes uniformly spaced over the detector. Alternatively one could reduce the thickness of the cadmium sheet to approximately .004" to accomplish the same purpose.

In accordance with a further aspect of the herein disclosed invention, it is contemplated that the neutron interaction material in the vicinity of the neutron-gamma ray detector may be placed around the outside of the casing of the logging instrument in the vicinity of the detector, rather than inside the casing as shown in the drawings. For example, this aspect may advantageously be carried out by plating the outside of the logging instrument in the vicinity of the neutron-gamma ray detector with a predetermined quantity of cadmium and an external layer of epoxy resin in order to provide for effective neutralization of the effect of chlorine upon the neutron-gamma ray log and for mechanical reliability, as discussed in detail hereinabove.

The lower detector unit 129 is substantially like the upper detector unit 128, except that it is spaced farther from the source than the first detector. Utilizing two high efficiency multiple plate geiger counters 14" long and 2" in diameter, both of which were equipped with steel cathode plates, it was found that with the upper detector spaced 8" from the source, the lower detector should be spaced 14" from the source.

With the apparatus shown in FIG. 1 which utilizes scintillation counters in combination with discriminator apparatus, the neutron source may comprise a radium-beryllium source which emits significantly lower energy gamma radiation along with the neutron radiation, or a substantially gamma-free neutron source such as actinium 227 and beryllium or radium D and beryllium. However, in the case of the apparatus shown in FIG. 2, it is preferable to use a neutron source whose gamma ray emission is at least as low as that of an actinium 227 and beryllium source or equivalent. This enables the use of ¼" lead shielding around the respective detectors to eliminate the relatively small amount of adverse lower-energy gamma radiation from the measured radiation signal.

This application contains subject matter closely related to subject matter disclosed and claimed in applicant's co-pending applications Serial Nos. 820,236, 820,239, 820,240 and 820,241.

Obviously many modifications and variations of the invention, as hereinbefore set forth, may be made without departing from the spirit and scope thereof, and therefore only such limitations should be imposed as are indicated in the appended claims.

I claim:

1. Apparatus for conducting a radioactivity well log comprising an instrument housing adapted to be passed through a bore hole traversing a plurality of earth formations, said housing containing a source of fast neutrons, a first and second detecting unit quantitatively sensitive to radiation returning to the bore hole as a result of irradiation of the formation by neutrons from the source, each of said units comprising a detector of gamma rays having positioned in the vicinity thereof a predetermined quantity of neutron absorbing material characterized by the emission of radiation to which the detector is sensitive in response to the capture of a neutron, said detector being exposed to said radiation emitted from said neutron absorbing material, whereby the detector unit is rendered substantially insensitive to the presence of chlorine, both of said detecting units being spaced from said source beyond the critical distance where changes in hydrogen content of the irradiated formation do not affect the intensity of the radiation impinging on the detector, said second detector unit being spaced further from the source than the first detector unit so that the second detector unit is significantly more sensitive to the effect of gas in the irradiated formation than the first detector unit, and means for providing a signal display indicative of the signal outputs of said two detector units.

2. Apparatus according to claim 1 further comprising means for continuously urging a side of the logging instrument against the side of the bore hole as the instrument is passed through a bore hole for conducting a well log thereof.

3. Apparatus in accordance with claim 1 wherein both of said detectors are electrical pulse producing type detectors of the high efficiency multiple plate cathode gieger type.

4. Apparatus in accordance with claim 1 wherein the predetermined quantity of neutron adsorbing material is comprised essentially of cadmium.

References Cited in the file of this patent

UNITED STATES PATENTS

| | | |
|---|---|---|
| Re. 24,383 | McKay | Oct. 29, 1957 |
| 2,469,461 | Russell | May 10, 1949 |
| 2,469,462 | Russell | May 10, 1949 |
| 2,469,463 | Russell | May 10, 1949 |
| 2,862,106 | Scherbatskoy | Nov. 25, 1958 |
| 2,933,609 | Norelius | Apr. 19, 1960 |

UNITED STATES PATENT OFFICE
CERTIFICATE OF CORRECTION

Patent No. 3,151,242

September 29, 1964

Hugh E. Hall, Jr.

It is hereby certified that error appears in the above numbered patent requiring correction and that the said Letters Patent should read as corrected below.

Column 1, line 34, for "inidcate" read -- indicate --; column 5, line 25, for "emited" read -- emitted --; column 6, line 70, for "200 mg." read -- 200 MC --; column 7, line 14, for "flaks" read -- flask --; line 26, for "Leters" read -- Letters --; column 8, line 42, for "coresponding" read -- corresponding --.

Signed and sealed this 27th day of April 1965.

(SEAL)
Attest:

ERNEST W. SWIDER
Attesting Officer

EDWARD J. BRENNER
Commissioner of Patents